United States Patent
Braudaway et al.

(10) Patent No.: US 7,266,216 B2
(45) Date of Patent: Sep. 4, 2007

(54) INSERTING AND DETECTING WATERMARKS IN IMAGES DERIVED FROM A SOURCE IMAGE

(75) Inventors: Gordon W. Braudaway, Yorktown Heights, NY (US); Frederick C. Mintzer, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 10/636,002

(22) Filed: Aug. 7, 2003

(65) Prior Publication Data

US 2005/0031157 A1   Feb. 10, 2005

(51) Int. Cl.
G06K 9/00 (2006.01)
G06K 9/32 (2006.01)
G06K 15/00 (2006.01)

(52) U.S. Cl. .................. 382/100; 382/298; 358/3.28
(58) Field of Classification Search .............. 382/100, 382/276, 293, 298, 299; 358/3.28
See application file for complete search history.

(56) References Cited

U.S. PATENT DOCUMENTS 7,095,873 B2 *   8/2006   Venkatesan et al. ........ 382/100

OTHER PUBLICATIONS

Alghoniemy et al. "Geometric Distortion Correction Through Image Normalization." 2000 IEEE International Conference on Multimedia and Expo, Jul. 30-Aug. 2, 2000, vol. 3, pp. 1291-1294.*

* cited by examiner

*Primary Examiner*—Colin LaRose
(74) *Attorney, Agent, or Firm*—Ido Tuchman; Lisa M. Yamonaco

(57) ABSTRACT

The present invention provides an image watermarking technique whereby a watermark is inserted into an adjusted digital source image that is bounded by a specific bounding rectangle. If the source image is larger than the rectangle, its dimensions are reduced by a common factor until it is the largest adjusted image that lies totally within the rectangle. A watermark is inserted into the adjusted image and at least one derived image of larger or smaller size is produced. Then, regardless of the size of an image derived from the watermarked adjusted image, enlarging or reducing that image to again lie within the rectangle greatly facilitates detection of the imbedded watermark. The size of the bounding rectangle may be specific to each source image, or, conversely, a common bounding rectangle may be used for a group of source images.

5 Claims, 3 Drawing Sheets

INSERTING AND DETECTING WATERMARKS IN IMAGES DERIVED FROM A SOURCE IMAGE

FIELD OF THE INVENTION

This application is directed to the field of digital imaging. It is more specifically concerned with the insertion of identifying marks in a source digital image, and the detection of those same identifying marks in a set of images of different sizes that are derived from the source digital image.

BACKGROUND OF THE INVENTION

Various invisible watermarking techniques are known to those skilled in the art. Each technique generally has different advantages and satisfies different levels of robustness, security and adaptability. Many of these employ particular algorithms in determining how the pixel data of pixels in the unmarked source digital image is to be modified in order to include the particular watermark. In general, each watermark inserting technique has a corresponding watermark detecting technique. The common feature of most of these techniques is that the pixel data, or the resulting pel data, is ultimately modified in a particular way that is intended to make the modification unseen.

It is a constant endeavor to find improved techniques of placing invisible identifying marks, herein called watermarks, into a digital image. The ability to detect the presence of watermarks in a digital image is generally useful to help establish ownership, origin and authenticity, and also to discourage those who might wish to misappropriate the work. Identifying marks are also useful to give evidence of unauthorized disclosure. Heretofore watermarking methods have been concerned with inserting a watermark into a digital image after it is enlarged or reduced in size, herein called resizing, for presentation. For an inserted watermark to be subsequently detected, many image watermarking methods require that every copy of a watermarked digital image must be restored to its presentation size so a one-to-one pixel position correlation with elements in a watermarking plane can be achieved before detection is attempted. If a derived image is not resized correctly and its pixel's positions are not correlated one-to-one with elements of its appropriate watermarking plane, watermark detection will fail.

SUMMARY OF THE INVENTION

Thus, the present invention provides a watermarking technique whereby a watermark is inserted into a digital image that is bounded by a specific bounding rectangle. If the source image is larger horizontally and/or vertically than the bounding rectangle, it is reduced in the horizontal dimension by a horizontal factor and in the vertical dimension by a vertical factor until it lies totally within the bounding rectangle with at least one pair of its parallel edges touching parallel edges of the bounding rectangle. If the source image is smaller horizontally and vertically than the bounding rectangle, it is enlarged by a horizontal factor and vertical factor in horizontal and vertical dimension until at least one pair of its parallel edges touch parallel edges of the bounding rectangle.

In an advantageous embodiment the horizontal factor and vertical factors are equal. If they differ at all, the difference must be small to avoid distorting the appearance of the image. Thus, if the source image is larger horizontally and/or vertically than the bounding rectangle, it is reduced in both horizontal and vertical dimensions by a common factor until it lies totally within the bounding rectangle with at least one pair of its parallel edges touching parallel edges of the bounding rectangle. If the source image is smaller horizontally and vertically than the bounding rectangle, it is enlarged by a common factor in horizontal and vertical dimension until at least one pair of its parallel edges touch parallel edges of the bounding rectangle. (Regardless of the shape of the source image, the resized image is the largest image that will fit entirely within the bounding rectangle.) The reduced or enlarged image, or the source image if resizing is not needed, is called an adjusted image. Then, regardless of the size of an image derived from the watermarked adjusted image, enlarging or reducing the derived image to touch at least one pair of parallel edges of the specific bounding rectangle, and with the resized image contained entirely within the bounding rectangle, greatly facilitates detection of the imbedded watermark.

It is an aspect of the present invention to provide methods, systems and apparatus for resizing a source image so that the resized image lies entirely within a specified bounding rectangle, with at least one pair of its parallel edged touching parallel edges of the bounding rectangle.

Another aspect of the present invention provides methods, systems and apparatus for inserting an invisible watermark into the adjusted image. After watermark insertion into an adjusted image, the present invention includes forming at least one derived image by further resizing of the watermarked adjusted image.

In another aspect of the present invention, the size of the bounding rectangle chosen may be specific to each source image, or, conversely, a common bounding rectangle may be used for a group of source images.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
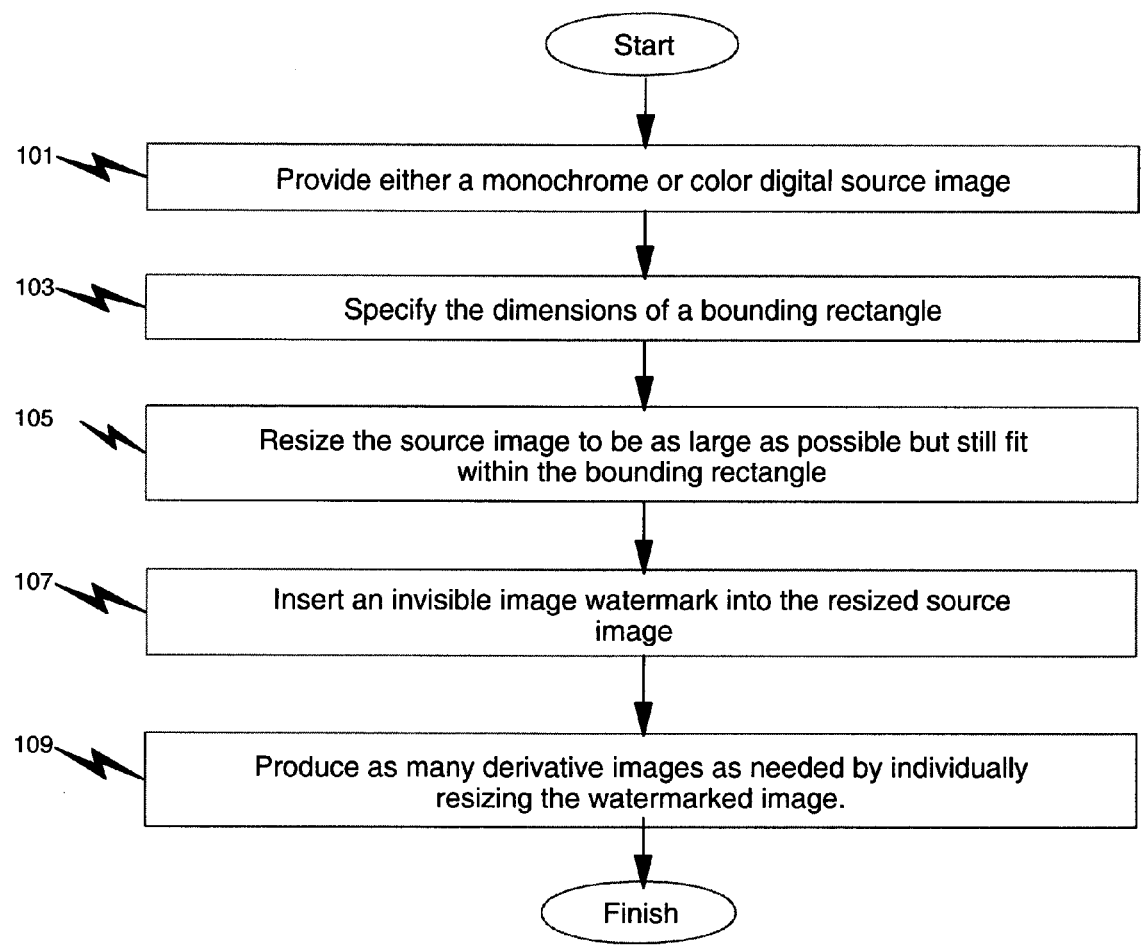
FIG. 1 shows an example of a watermarking insertion procedure in accordance with the present invention.

The present invention provides methods, systems and apparatus for a watermarking technique whereby a watermark is inserted into a digital image that is bounded by a specific bounding rectangle. The bounding rectangle has dimensions of M pixels wide and N pixels high. If the source image is larger horizontally and/or vertically than the bounding rectangle, it is reduced in both horizontal and vertical dimensions by horizontal and vertical factors, or by a common factor, until it lies totally within the bounding rectangle with at least one pair of its parallel edges touching parallel edges of the bounding rectangle. If the source image is smaller horizontally and vertically than the bounding rectangle, it is enlarged by a common factor in horizontal and vertical dimension until at least one pair of its parallel edges touch parallel edges of the bounding rectangle. The reduced or enlarged image, or the source image if resizing is not needed, is called an adjusted image. Then, regardless of the size of an image derived from the watermarked adjusted image, enlarging or reducing the derived image to touch at least one pair of parallel edges of the specific bounding rectangle, and with the resized image contained entirely within the bounding rectangle, facilitates detection of the imbedded watermark.

In a particular embodiment, the present invention provides methods, systems and apparatus for resizing a source image so the resized image lies entirely within a specified bounding rectangle with at least one pair of its parallel edged touching parallel edges of the bounding rectangle. The image so produced is called an adjusted image. There are many methods for resizing digital images known to those skilled in the art. Nearly any one of them may be used for resizing purposes providing the chosen method preserves the ratio of image width to image height.

The present invention employs methods for inserting an invisible watermark into the adjusted image. After watermark insertion into an adjusted image, the present invention provides methods, systems and apparatus for forming at least one derived image by further resizing of the watermarked adjusted image.

In a general embodiment, the size of the bounding rectangle chosen may be specific to each source image, or, conversely, a common bounding rectangle may be used for a group of source images. Generally, there is limitation of the useful range of the resizing factor, which relates the dimensions of the smallest desired derivative image and the dimensions of the bounding rectangle. A value of the resizing factor that is less than 0.1 makes the probability of detecting the imbedded watermark small. However, since detection is a probabilistic event dependent on the watermarking method chosen and on the image being watermarked, for some cases this factor can be still smaller. A usually useful resizing factor is greater than 0.125, for the watermarking method in the example embodiment.

The present invention is adaptable for use with any of many watermarking techniques. It is most particularly adaptable to a watermarking technique employing a watermarking plane. Thus, although the present invention is adaptable to many watermarking techniques, it is most easily described and adaptable to the watermark inserting and detecting methods described in U.S. Pat. No. 5,530,759 and U.S. Pat. No. 5,825,892 which are herein included by reference in entirety for all purposes.

There are advantages to inserting a watermark into a digital image, or a set of digital images, at a common size before it is resized to its presentation size. In this case, any candidate watermarked image can be restored to the common size and a detection may be attempted on that restored-size image. If the converse is true, the candidate image must be restored to each of the presentation sizes prepared from its source image and detection must be attempted at each of the presentation sizes. If the system produces n presentation-sized versions of the source image, on average half that number, n/2, detections would be required. If the system produces presentation images at a very large number of resolutions, as would be done with a "continuously-variable" zoom, the number of detections required for a candidate image would be very large.

Invisible marks are herein classified relative to the appearance of that mark to a human being with normal visual acuity. A mark inserted into an image is classified as having an invisibility classification level of undetectably invisible if, when the image without the marking is displayed together with an image copy with the marking, the human being is equally likely to select either of these copies as an unmarked copy. An undetectably invisible mark is below or at the human being's threshold of just-noticeable difference. A mark on an image is classified as having an invisibility classification level of subliminally invisible if the mark is not distracting to the human being, although it is above the human being's threshold of just-noticeable difference. An image marking is classified as being marginally invisible if it does not cause the marked image to lose its usefulness or value because of the mark. An image marking is classified as being poorly invisible if the marking is relatively obvious or distracting, and causes a reduction in the image's usefulness and/or value.

Presently, invisible markings of digital images are used as a generally dependable method of establishing evidence of ownership and authenticity. A digital image is an abstraction of a physical image that has been scanned or artificially created and stored in a computer's memory as rectangular arrays of numbers corresponding to that image's (one or more) color planes. Each array element corresponds to a very small area of the physical image and is called a picture element, or pixel. The numeric value associated with each pixel for a monochrome image represents the magnitude of its average brightness of its single color (for example, black and white) plane. For a color image, each pixel of the digital image has values associated and representing the magnitudes of average brightness of its color components represented in its three or more color planes.

Whenever reference is made herein to color planes, it is understood to include any number of color planes used by a particular image's digitizing technique to define the pixel's color characteristics. This includes the case when there is only a single plane defining a monochromatic image. Pixel values have a magnitude represented by at least one binary digit or bit.

Generally, a digital image is recognizable as an image to a viewer only when the individual pixels are displayed as dots of white or colored light on a display, or as dots of black or colored inks on paper. Pixels are normally spaced so closely as to be not resolvable by a human visual system. This results in the fusion of neighboring pixels by the human visual system into a representation of the original physical image. Image fusion by the human visual system makes invisible marking, or relatively invisible marking, of images possible. This property is fully exploited by the methods described here to both insert an invisible watermark into a digital image or digital image to a desired invisibility classification, and to subsequently demonstrate its existence. The inserting and demonstrated detection of a robust invisible marking on digital and printed digital images called hard copy images, herein called invisible watermarking, are primary aspects of the present invention.

A proper invisible watermarking technique that inserts an invisible watermark into a digital image should satisfy several properties. The inserted watermark should appear to be invisible to any person having normal or corrected to normal visual accommodation to a desired invisibility classification level.

Clearly, the degree of marking is a dichotomy. A balance has to be struck between protecting the image from unauthorized uses and not having the watermark unpleasantly alter the appearance of the image. This generally means that a recognizable pattern should not be apparent in the marked image when the watermark is applied to a uniformly colored plane. This requirement discourages marking the image by varying the hue of its pixels, since the human visual system is significantly more sensitive to alterations in hue than in brightness. The requirement can be satisfied by a technique based on varying picture element brightness implemented in a proper way. A technique based on varying picture element brightness also allows the same marking technique applied to color images to be equally applicable to monochrome images.

Another property of a proper invisible watermarking technique is that it should have a detection scheme such that the probability of a false-positive detection, that is, the false detection of a mark when one, in fact, does not exist, is very small. For purposes of the present invention, the probability of detection of a watermark in an image when one does not exist should be less than one in a million. There is generally little difficulty satisfying this requirement when the technique is statistically based.

Still another property of a proper watermarking technique is that it should be possible to vary the degree of marking applied to an image. In this way, the watermark can be made as detectable as necessary by the particular application. This property is important in highly textured images where it is often necessary to increase the intensity of the mark to increase its likelihood of detection. This is in contradistinction with images that have low contrast in which it is advantageous to reduce the marking intensity to lessen undesirable visible artifacts of the watermark itself.

Finally, the inserted watermark should be robust in that it should be very difficult to be removed or rendered undetectable. It should survive such image manipulations that in themselves do not damage the image beyond usability. This includes, but is not limited to, JPEG "lossy" compression, image rotation, linear or nonlinear resizing, brightening, sharpening, "despeckling," pixel editing, color-space conversion, the malicious superposition of a correlated or uncorrelated noise field upon the digital image, and its subsequent conversion to halftone and printing. Attempts to defeat or remove the watermark should be generally more laborious and costly than purchasing rights to use the image. If the image is of rare value, it is desirable that the watermark be so difficult to remove that telltale traces of it can almost always be recovered.

It will be clear to those skilled in the art that other modifications to the disclosed embodiments can be effected without departing from the spirit and scope of the invention. The embodiments described below, ought to be construed to be merely illustrative of some of the more prominent features and applications of the invention. Other beneficial results can be realized by applying the disclosed invention in a different manner or modifying the invention in ways known to those familiar with the art.

Referring to FIG. 1, the watermarking procedure described so far may be viewed as first providing a monochrome or color digital source image (101), specifying the dimensions of a desired bounding rectangle (103) into which the source image will be enlarged or reduced to fit. If the source image is larger horizontally and/or vertically than the bounding rectangle, it is reduced in both horizontal and vertical dimensions by a common first factor f1, which is less than 1, until it lies totally within the bounding rectangle with at least one pair of its parallel edges touching parallel edges of the bounding rectangle. If the source image is smaller horizontally and vertically than the bounding rectangle, it is enlarged in horizontal and vertical dimension by the common factor f1, which is greater than 1, until at least one pair of its parallel edges touch parallel edges of the bounding rectangle (105). The reduced or enlarged source image, or the source image itself if resizing is not needed, is called an adjusted image. An invisible watermark is then imbedded into that adjusted image (107). Finally, the watermarked adjusted image is resized by a second factor, f2. There can be as many different values of f2 as desired, with each different value producing a differently sized derivative image (109).

Figure 2:
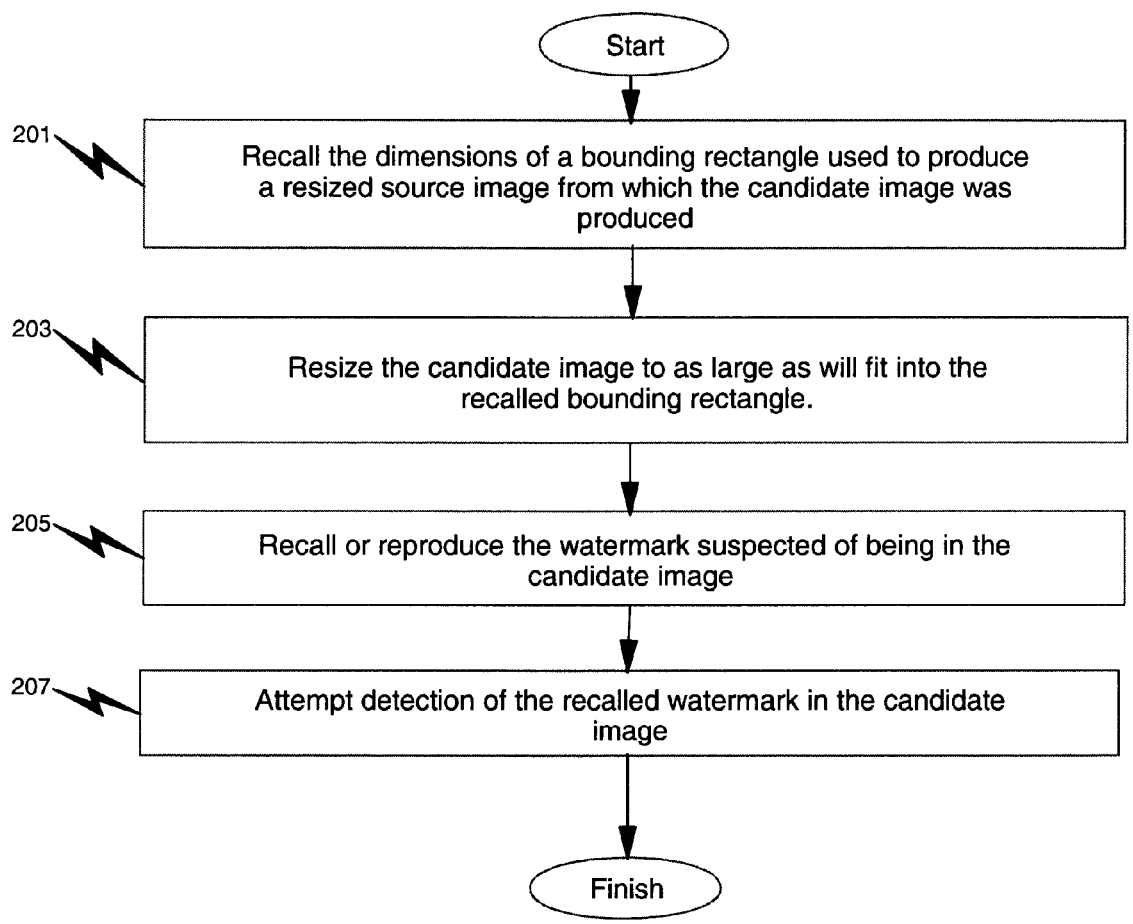
FIG. 2 shows an example of a watermarking detection procedure in accordance with the present invention.

Detecting the watermark in a candidate image, regardless of the size of the candidate image, becomes a common procedure. Referring to FIG. 2, the dimensions of the bounding rectangle used produce the resized source image to which the candidate image corresponds are recalled (201). The candidate image is resized, if necessary, to form a resized candidate image that is as large as will fit into the recalled bounding rectangle, having at least one pair of the resized candidate image's parallel edges touching a pair of parallel edges of the recalled bounding rectangle (203). The watermark suspected of being imbedded in the candidate image is recalled or reproduced (205), and an attempt is made to detect the recalled or reproduced watermark in the resized candidate image (207).

Figure 3:
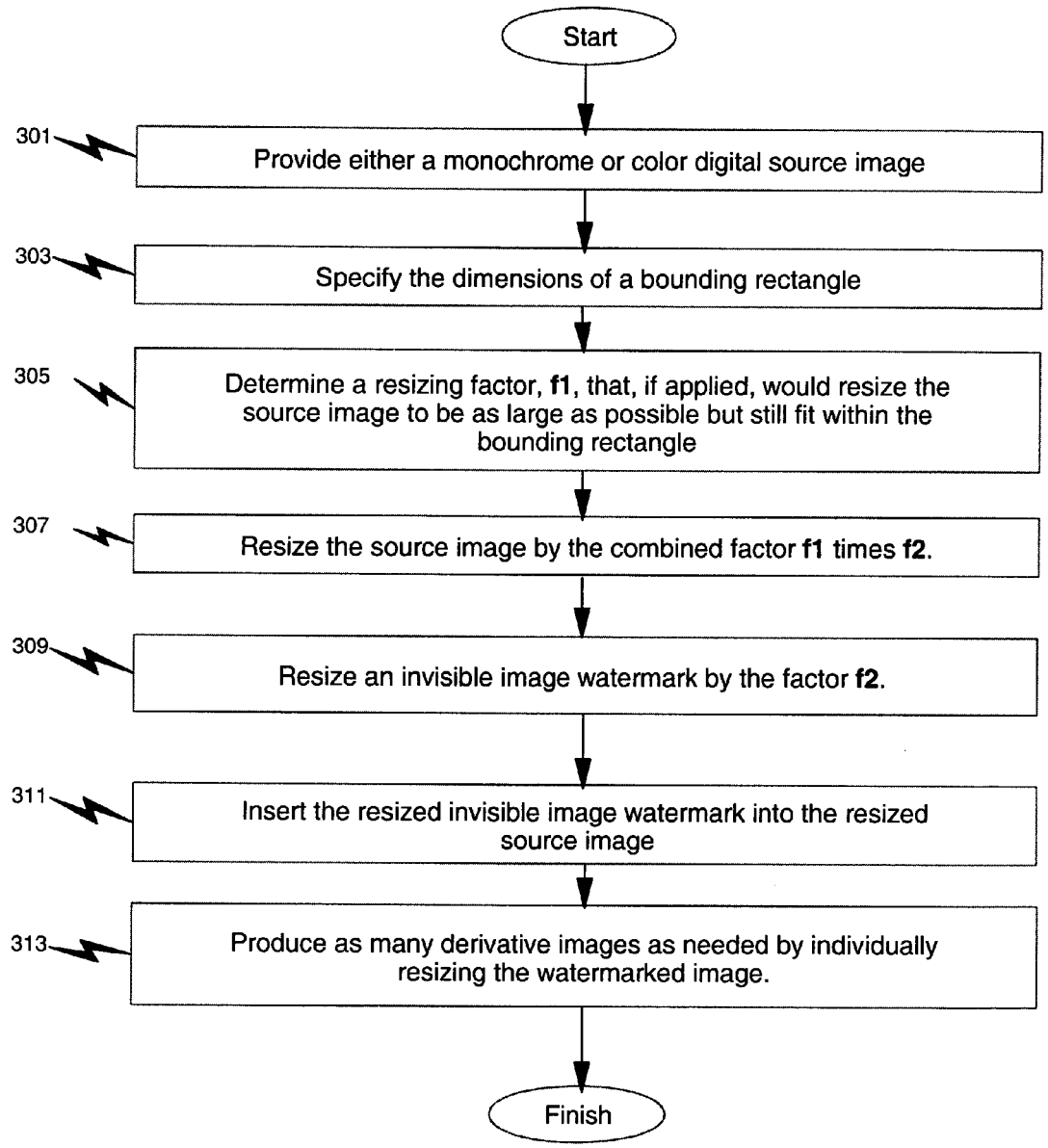
FIG. 3 shows an example of an alternative method for producing watermarked derivative images.

One skilled in the art will recognize that, alternatively, the reduction steps in the process may be rearranged to produce an equivalent watermarked image of the same size. Referring to FIG. 3, those rearranged steps require first providing a monochrome or color digital source image (301), specifying the dimensions of a desired bounding rectangle (303), determining the resizing factor f1 that, if it were to be applied, would resize the source image to fit into the bounding rectangle (305); resizing the source image by the combined factor f1 times f2 to form an alternative adjusted image (307); resizing the watermarking plane by the factor f2 to form an adjusted watermark (309); and lastly, inserting the adjusted watermark into the alternative adjusted image to form a prototype watermarked image (311). As many individual derivative images of different sizes may then be made by resizing the prototype watermarked image (313).

Thus the present invention includes a method including the steps of: obtaining a digitized image to be protected by a watermark; specifying a digitized bounding rectangle having known horizontal and vertical dimensions; forming a resized image by resizing the horizontal and vertical dimensions of the image by a horizontal factor and a vertical factor, or a common factor, so that the resized image is a largest replica of the digitized image fitting entirely within the bounding rectangle; and imbedding the watermark into the resized image to form a watermarked image.

In some embodiments the common factor is greater than 0.1. In some embodiments, the method includes forming at least one derivative copy of the watermarked image. Each copy preserves the ratio of horizontal dimension to vertical dimension an nearly as practicable.

The present invention also includes a method for inserting a watermark into at least one derivative image, including the steps of: providing a source digital image having at least one image plane, each image plane being represented by an array having pixel brightness data for a plurality of pixels, each of the pixels having at least one color component and having a pixel position; specifying horizontal and vertical dimensions of a bounding rectangle; resizing the source image by enlargement or reduction of its horizontal and vertical dimensions by a common factor to form an adjusted image so that the resized image is a largest replica of the digitized image fitting entirely within the bounding rectangle; inserting into the adjusted digital image an invisible image watermark; and producing at least one derived image by resizing the watermarked adjusted image.

The present invention also includes a method for inserting a watermark into at least one derived image, including the steps of: providing a source digital image having at least one image plane, each image plane being represented by an array having pixel brightness data for a plurality of pixels, each of the pixels having at least one color component and having a pixel position; specifying the horizontal and vertical dimensions of a bounding rectangle; determining an enlargement or reduction first factor f1 that, if applied, would resize the source image by enlargement or reduction of its horizontal and vertical dimensions so that the resized image is a largest replica of the digitized image fitting entirely within the bounding rectangle; forming an adjusted invisible image watermark that is enlarged of reduced by a second factor f2; resizing the source image by enlargement or reduction of its horizontal and vertical dimensions by a combined common factor, f1 times f2, to form an alternative adjusted digital image. In some embodiments, the method includes inserting the adjusted invisible image watermark into the alternative adjusted digital image, and/or the factor f2 is greater than 0.1.

The present invention also includes a method for detecting a watermark imbedded in a candidate image employing a bounding rectangle, including the steps of: recalling dimensions of the bounding rectangle used to produce a resized source image from which the candidate image was produced; forming a resized image by resizing the horizontal and vertical dimensions of the candidate image by a common factor so the resized image is the largest replica of the candidate image fitting entirely within the bounding rectangle; reproducing the watermark suspected of being in the candidate image; and attempting detection of the watermark in the resized image. In some embodiments, the method further includes employing results obtained from the step of attempting, and/or determining if the candidate is a derivative copy of the source image.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention. The invention also includes apparatus for implementing steps of method of this invention.

The present invention can be realized in hardware, software, or a combination of hardware and software. An image resizing tool and a watermark detection tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising inserting a watermark into at least one derived image, including the steps of:

provinding a source digital image having at least one image plane, each said image plane being represented by an array having pixel brightness data for a plurality of pixels, each of said pixels having at least one color component and having a pixel position;

specifying the horizontal and vertical dimensions of a bounding rectangle, determining an enlargement or reduction first factor f1 that, if applied, would resize the source image by enlargement or reduction of its horizontal and vertical dimensions so that the resized image is a largest replica of said digitized image fitting entirely within the bounding rectangle;

forming an adjusted invisible image watermark that is enlarged or reduced by a second factor f2;

resizing the source image by enlargement or reduction of its horizontal and vertical dimensions by a combined factor, f1 times f2, to form an alternative adjusted digital image.

2. A method as recited in claim 1, further comprising inserting into said alternative adjusted digital image said adjusted invisible image watermark.

3. A method as recited in claim 1, wherein the factor f2 is greater than 0.1.

4. An article of manufacture comprising a computer usable medium having computer readable program code means embodied therein for causing watermark insertion, the computer readable program code means in said article of manufacture comprising computer readable program code means for causing a computer to effect the steps of claim 1.

5. A program storage device readable by machine, tangibly embodying a program of instructions executable by the machine to perform method steps for watermarking, said method steps comprising the steps of claim 1.

* * * * *